(12) United States Patent
Hsiao (10) Patent No.: US 8,279,599 B2
(45) Date of Patent: Oct. 2, 2012

(54) COMPOSITE CASING STRUCTURE (75) Inventor: Hsiu Min Hsiao, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 239 days.

(21) Appl. No.: 12/892,762

(22) Filed: Sep. 28, 2010

(65) Prior Publication Data

US 2011/0310553 A1     Dec. 22, 2011

(30) Foreign Application Priority Data

Jun. 21, 2010   (CN) .......................... 2010 1 0204045

(51) Int. Cl.
*G06F 1/16* (2006.01)

(52) U.S. Cl. ................... 361/679.55; 312/194; 248/459; 349/141

(58) Field of Classification Search .................. 312/327, 312/263, 30, 236, 223.1, 27, 194; 248/442.1, 248/222.14, 205.1, 284.1, 205.3, 459; 361/679.55, 361/679.21, 679.41, 679.4, 679.44, 679.23, 361/679.27, 679.43, 679.31, 679.6, 679.33, 679.35, 700; 206/308.1, 723; 720/646, 601, 604; 349/122, 62, 147, 110, 60, 141; 455/230, 575.1, 575.7, 78, 517

See application file for complete search history.

(56) References Cited

U.S. PATENT DOCUMENTS

| | | | | |
|---|---|---|---|---|
| 5,402,885 | A * | 4/1995 | Cook et al. .................... | 206/723 |
| 7,996,858 | B2 * | 8/2011 | Ohira ............................ | 720/646 |
| 2008/0124624 | A1 * | 5/2008 | Lin ................................ | 429/163 |
| 2011/0215012 | A1 * | 9/2011 | Haggard ................... | 206/308.1 |

* cited by examiner

*Primary Examiner* — Hung Duong (57) ABSTRACT

A composite casing structure is applied to a housing of an electronic device. The composite casing structure includes a plastic frame and a metal plate. The plastic frame has a plurality of side walls surrounding four side edges thereof, and at least one open portion is formed by the side walls. The metal plate is combined with the plastic frame, and at least one reinforcing rib is formed on a surface of the metal plate, such that a position of the reinforcing rib is corresponding to a position of the open portion. With such a structural design, the composite casing has a lightweight and high-strength structure.

7 Claims, 8 Drawing Sheets

COMPOSITE CASING STRUCTURE

BACKGROUND OF THE INVENTION

1. Field of the Invention

The present invention relates to a composite casing structure, and more particularly to a composite casing structure applied to a housing of an electronic device.

2. Related Art

A chassis of an ordinary notebook computer is usually divided into four parts. The first part refers to an outer cover of a liquid crystal display (LCD) (LCD Rear Cabinet, commonly referred to as Part A in the industry); the second part refers to a frame of the LCD (LCD Front Cabinet, commonly referred to as Part B in the industry); the third part refers to a keyboard frame (Top Cabinet, commonly referred to as Part C in the industry); and the fourth part refers to a base of the notebook computer (Bottom Cabinet, commonly referred to as Part D in the industry).

In addition, notebook computers are divided into two usage types, that is, commercial notebook computers, and notebook computers for industrial or military purposes. Therefore, it should be noted that the requirements of notebook computers for industrial or military purposes are different from those of commercial notebook computers when designing the notebook computers for industrial or military purposes. The notebook computers for industrial or military purposes are always used in harsh environments, for example, operated in excessively humid or dusty environments, so that the notebook computers for industrial or military purposes have much higher requirements for water proof, dust proof, and impact resistance than the commercial notebook computers. That is to say, when a notebook computer for industrial or military purposes is designed, the strength of a housing structure thereof should be considered first, and the waterproof or dustproof function must be considered at the same time.

Therefore, currently, the design of notebook computers for industrial or military purposes by various manufacturers all actively develops toward thin structure, light weight, and high structural strength. Hence, lightweight materials, such as a carbon fiber material, a magnesium alloy material, and a plastic material, are usually used as raw materials for manufacturing a chassis, and parts of the chassis are designed by using the above materials in combination, and the characteristics of the selected materials directly influence the structural strength of the chassis of the notebook computer.

For example, if an outer cover (i.e., Part A) of the chassis is made of a plastic material, although the chassis weight of the notebook computer can be greatly reduced, the plastic chassis is easily cracked or even directly broken due to insufficient rigidity of the plastic material when a strong external force impacts the plastic chassis. Further, as notebook computers for industrial or military purposes are gradually developed toward compact size, the main board and electronic elements therein all require precise mechanism design. If the chassis is made of the plastic material, operation elements in the notebook computer are more easily damaged under impact due to insufficient strength. Moreover, since the plastic chassis also has many other problems such as poor heat dissipation and difficulty in recovery, treatment and recycling, the plastic chassis will be phased out in the market.

Therefore, in order to meet the requirements for lightweight and high-strength structure of notebook computers for industrial or military purposes as well as the environmental protection concept of recovery and recycling, relevant manufacturers use an aluminum-magnesium (AlMg) alloy material to manufacture chassis of notebook computers. The advantages of AlMg alloy include high strength hardness and light weight. However, due to high chemical activity, the AlMg alloy has low corrosion resistance, such that the AlMg alloy housing cannot easily achieve some special test specifications. For example, formation of hair lines on the surface of the AlMg alloy housing by anodic treatment cannot be easily achieved by the AlMg alloy housing. Moreover, the high fabrication cost of the AlMg alloy keeps the unit price of the AlMg alloy housing high.

In addition, when fabricating an outer cover (i.e., Part A) of a chassis, a stud is usually disposed on an edge surface of the outer cover, and a circuit board is disposed and positioned on the stud, so that a perforation on the circuit board is aligned with a screw hole of the stud. Afterwards, a frame of an LCD (i.e., Part B) and the outer cover are assembled to each other so that a screw hole of the frame is corresponding to the perforation of the circuit board and the screw hole of the stud. Then, a fastening element is passed through the screw hole of the frame and the perforation of the circuit board, and fastened in the screw hole of the stud, so that the circuit board can be tightly fastened between the outer cover and the frame.

However, due to light weight and thinness of the AlMg outer cover, if the AlMg outer cover itself is stamped or forged to form a specific structure (for example, a stud) by mechanical processing, the AlMg outer cover is easily broken or damaged due to an excessively large processing force. If a stud is fixed on the AlMg outer cover by welding or adhesion after the AlMg outer cover is formed, the entire fabrication process has to be performed by stages, which consumes much labor time and increases the fabrication cost. Moreover, the welding or adhesion manner easily damages the surface of the AlMg outer cover and impairs the appearance, and also easily causes the problem of flatness when studs are fixed on the AlMg outer cover.

Therefore, how to fabricate an outer cover (i.e., Part A) of a chassis which has a high-strength and lightweight structure as well as a complex structural design and facilitate various processing treatment (for example, chemical treatment such as anodic treatment) while reducing the fabrication cost is a problem to be solved by persons involved in the industry.

SUMMARY OF THE INVENTION

In the prior art, since complex structures (for example, studs) are fixed on the surface of the AlMg chassis by laser welding or adhesion with an anaerobic adhesive, the entire fabrication process is complex and time consuming, which fails to meet the requirements of chassis manufacturers for rapid and mass production. Accordingly, the present invention is a composite casing structure, which can solve the above problems.

The composite casing structure of the present invention is applied to a housing of an electronic device. The composite casing structure comprises a plastic frame and a metal plate. The plastic frame has a plurality of side walls. The side walls surround four side edges of the plastic frame respectively, and at least one open portion is formed and disposed on the side walls. The metal plate has at least one reinforcing rib on a surface thereof, and is combined with the plastic frame and covers the open portion, so that the reinforcing rib of the metal plate is corresponding to the open portion.

The above structural design with a combination of the metal plate and the plastic frame has not only a thin housing (the metal plate) but also a secure and lightweight backbone (the plastic frame). Moreover, complex structures are designed on the plastic frame, and high-rigidity structures are designed on the metal plate, so as to greatly reduce the overall weight and fabrication cost and increase the processing speed, thereby solving the problems encountered in the prior art when manufacturing housings of notebook computers of industrial standards using the AlMg alloy.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A composite casing structure of an electronic device according to the present invention is illustrated by taking an application to a chassis (i.e., Part A) of a notebook computer for industrial or military purposes. Definitely, the products applying the present invention and the application range of the present invention are not limited by the following embodiment.

Figure 1:
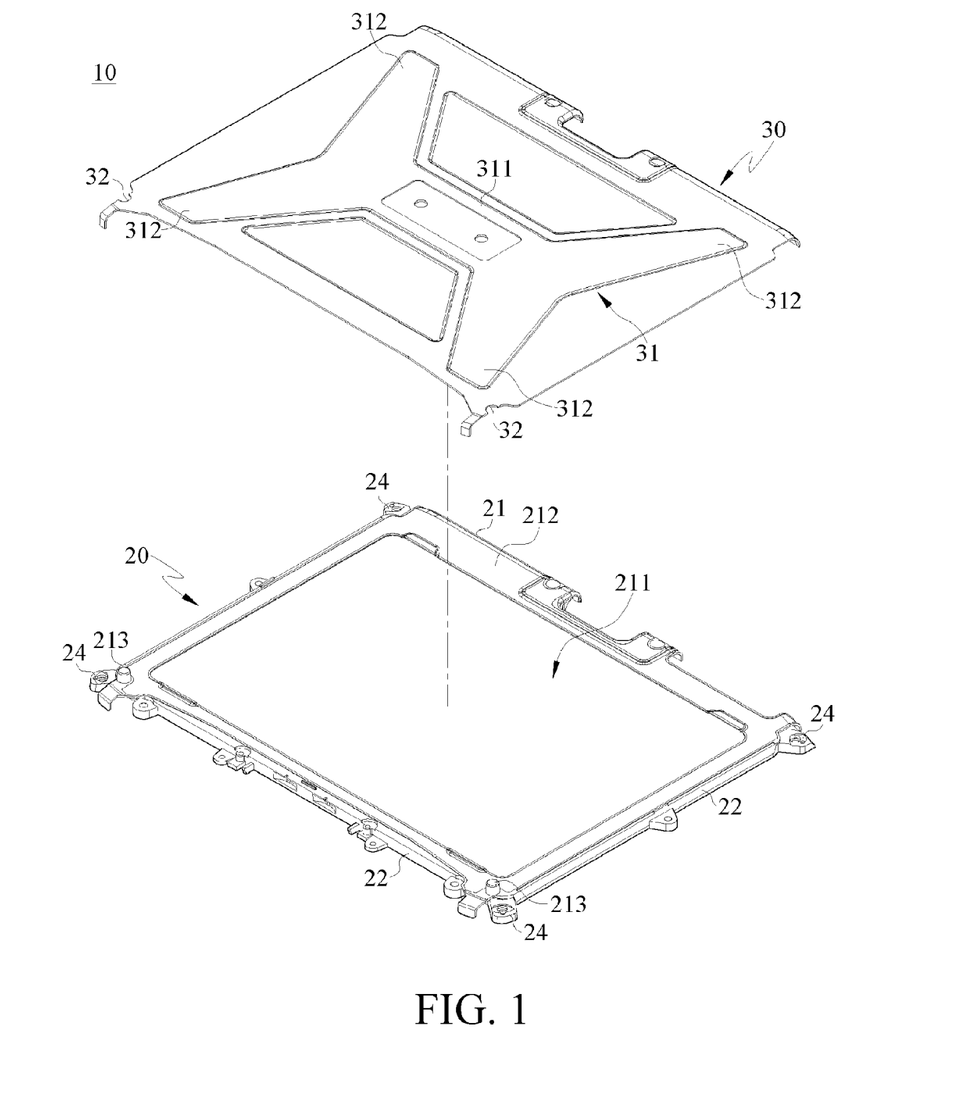
FIG. 1 is a schematic exploded view of a composite casing structure according to the present invention.
Figure 2:
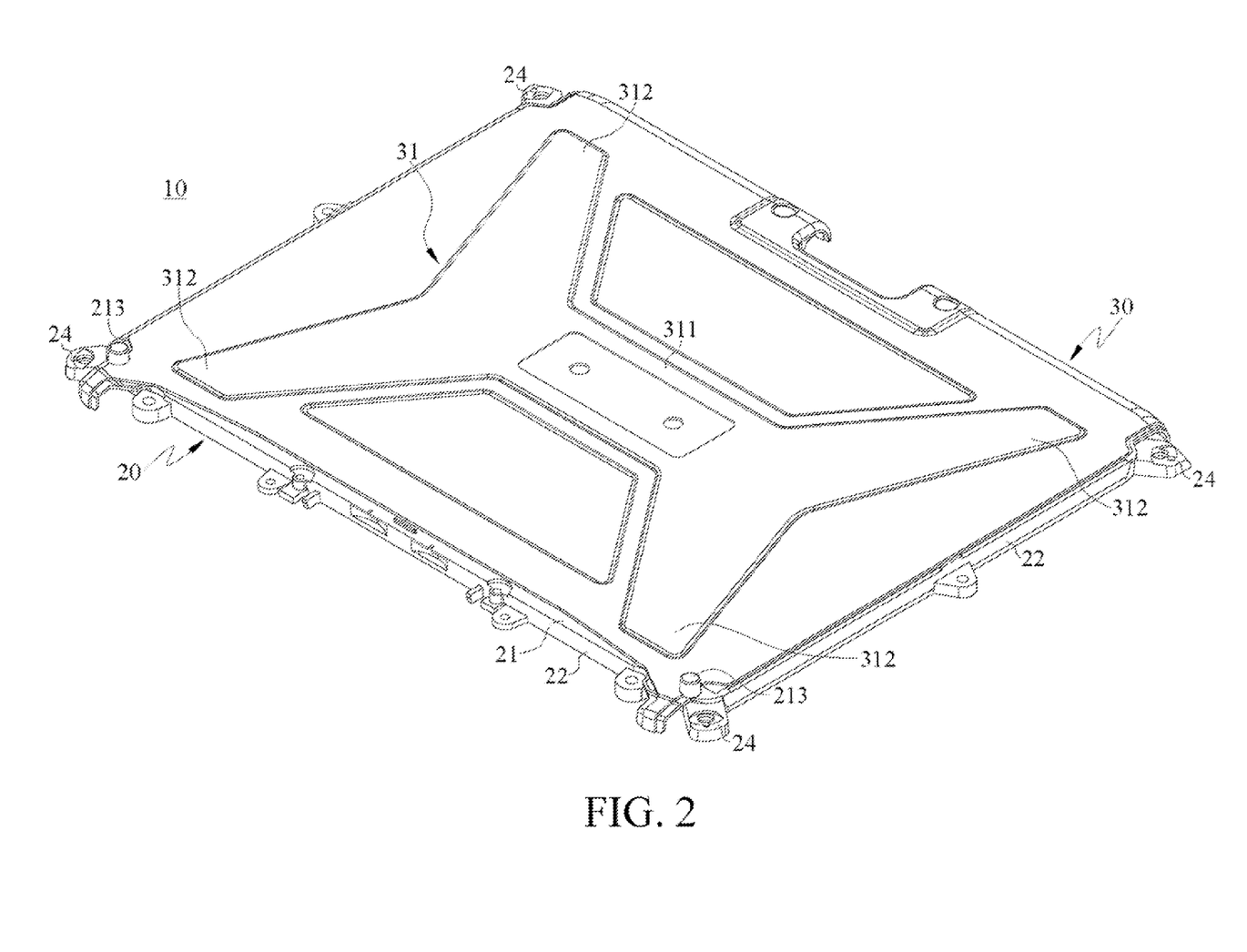
FIG. 2 is a schematic outside view of the composite casing structure according to the present invention.
Figure 3:
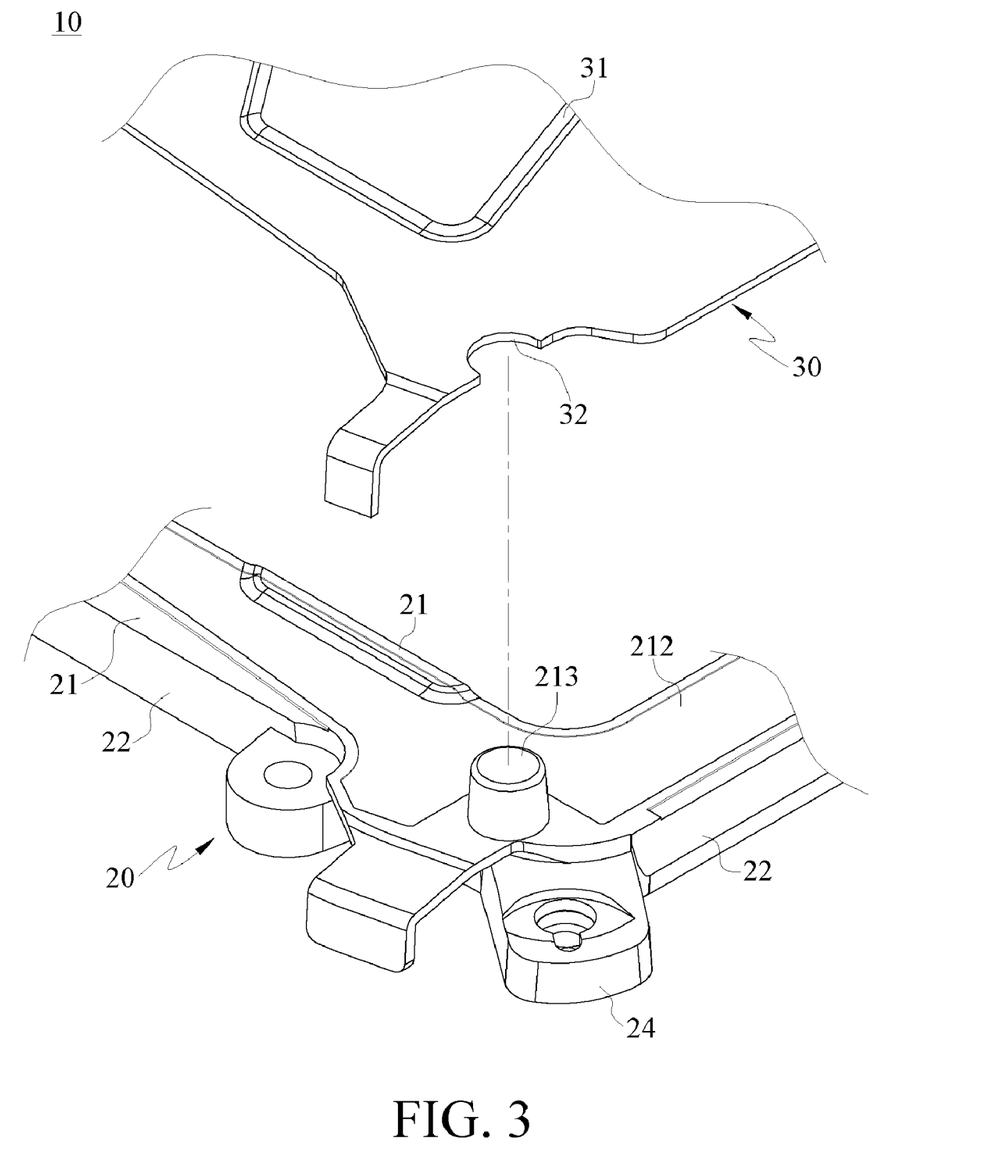
FIG. 3 is a schematic enlarged exploded view of the composite casing structure according to the present invention.
Figure 4:
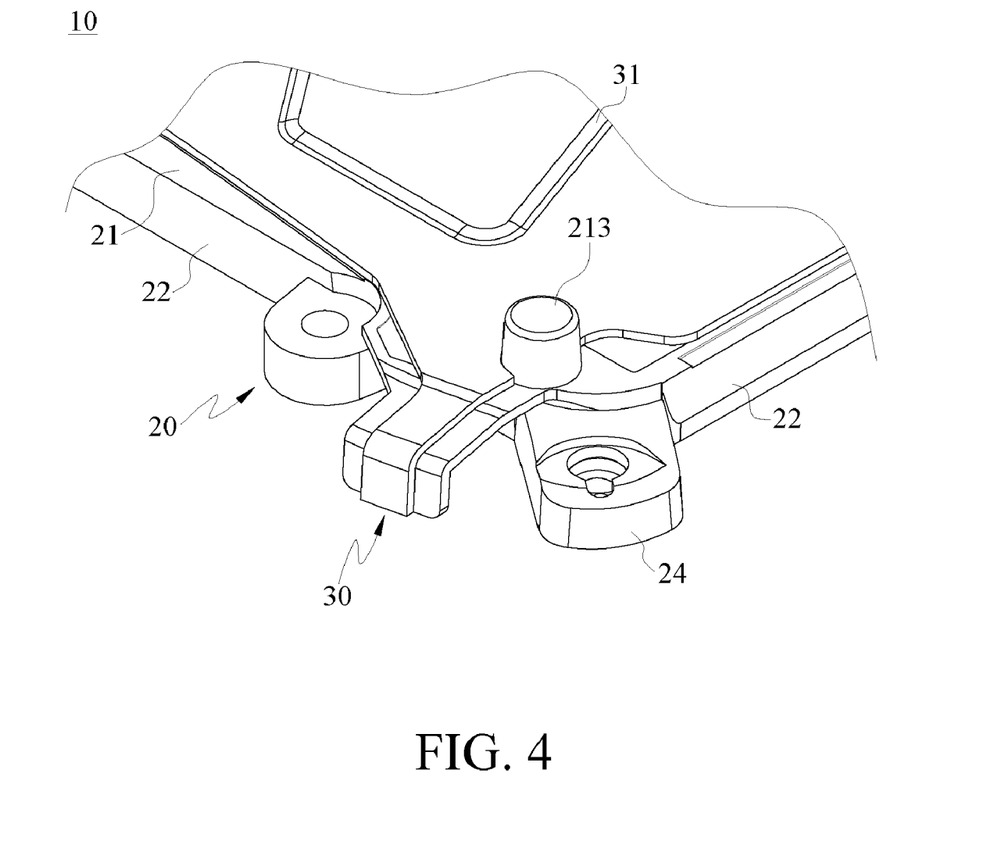
FIG. 4 is a schematic enlarged outside view of the composite casing structure according to the present invention.
Figure 5:
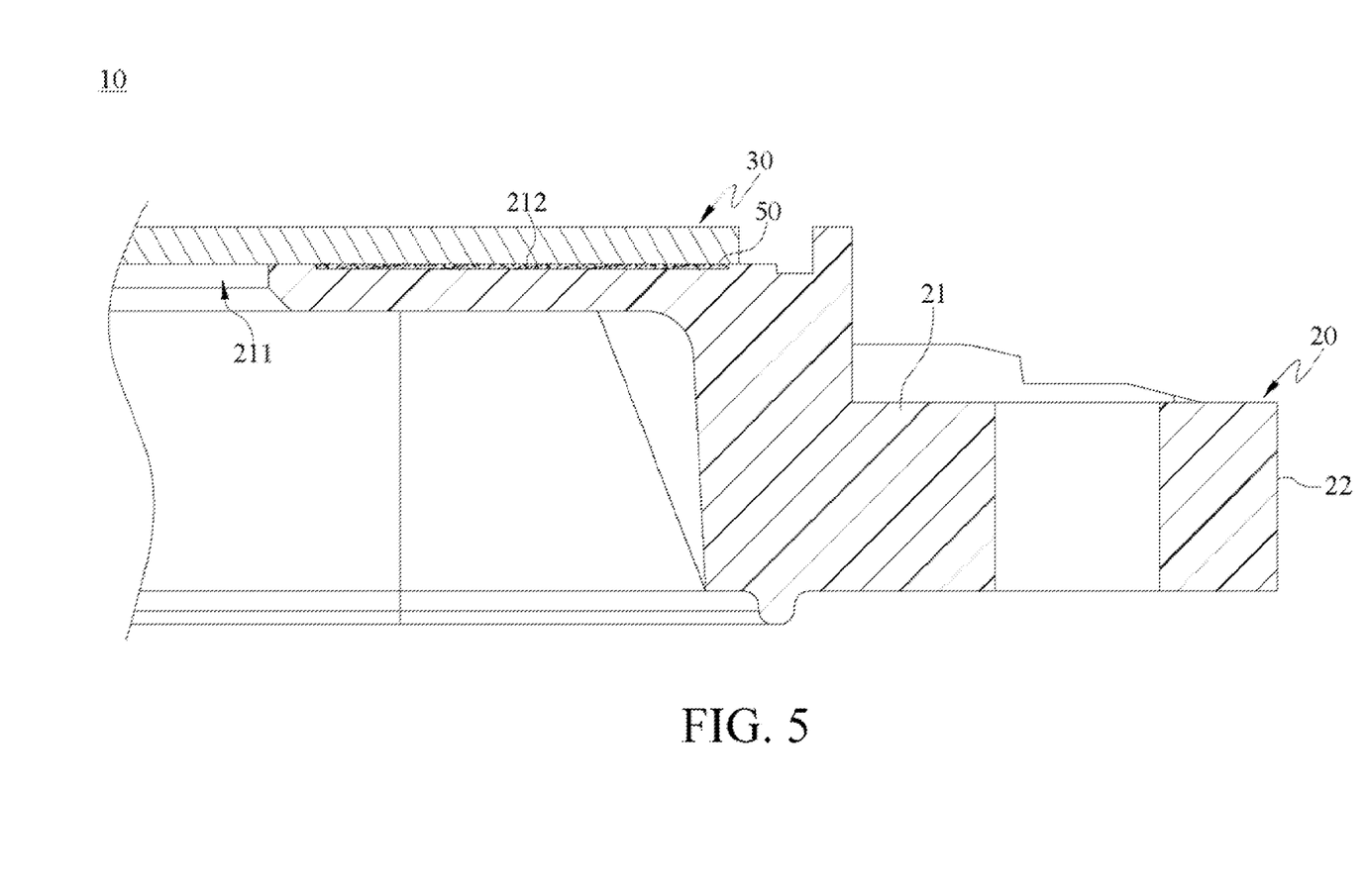
FIG. 5 is a schematic enlarged cross-sectional view of the composite casing structure according to the present invention.

FIG. 1 is a schematic exploded view of a composite casing structure according to the present invention. FIG. 2 is a schematic outside view of the composite casing structure according to the present invention. FIG. 3 is a schematic enlarged exploded view of the composite casing structure according to the present invention. FIG. 4 is a schematic enlarged outside view of the composite casing structure according to the present invention. FIG. 5 is a schematic enlarged cross-sectional view of the composite casing structure according to the present invention.

As shown in FIGS. 1 to 5, the composite casing 10 comprises a plastic frame 20 and a metal plate 30. The metal plate 30 is combined with the plastic frame 20. The plastic frame 20 has a substrate 21, and at least one open portion 211 is opened on a surface of the substrate 21. The open portion 211 may be opened in a central portion of the substrate 21 and run through the substrate 21, such that the substrate 21 is formed as a rectangular hollow structure. After the metal plate 30 is combined with the plastic frame 20, the metal plate 30 can cover the substrate 21 and the open portion 211 thereof.

In addition, the metal plate 30 may be manufactured by using one of aluminum, an aluminum alloy, a magnesium alloy, and an AlMg alloy or a composite material thereof, and the forming process thereof may be various metal production methods such as casting, extrusion, and forging. In this embodiment, at least one reinforcing rib 31 is formed on a surface of the metal plate 30 by stamping or forging, for increasing the structural strength of the metal plate 30, thereby preventing the metal plate 30 from deformation under load.

It should be noted that, as shown in FIG. 1, the reinforcing rib 31 extends and protrudes from the surface of the metal plate 30, and has an approximately H-shaped structure on the surface of the metal plate 30. In particular, the reinforcing rib 31 has a first protruding rib 311 laterally arranged on the surface of the metal plate 30, and a plurality of second protruding ribs 312 respectively extending from two opposite ends of the first protruding rib 311. The second protruding ribs 312 respectively extend outwards from intersections with the first protruding rib 311 to four corners of the metal plate 30. In this embodiment, the second protruding ribs 312 respectively extend obliquely to the corners and are engaged with the first protruding rib 311, but the present invention is not limited thereto. With the semi-arched structure formed by the first protruding rib 311 and the second protruding ribs 312, the construction of the reinforcing rib 31 for enlarging the stressed area can be formed on the surface of the metal plate 30. In this way, a lightweight and high-strength construction can be achieved without increasing the thickness of the metal plate 30, so as to intensify the overall stress on the metal plate 30.

As shown in FIGS. 3 to 5, in order to securely combine the metal plate 30 with the plastic frame 20, a surrounding trench 212 is opened on a surface of the substrate 21, and an adhesive 50 is uniformly distributed in the trench 212. Then, the metal plate 30 is attached to the substrate 21 of the plastic frame 20, so that the adhesive 50 is adhered to the metal plate 30, thereby strengthening the combination force between the plastic frame 20 and the metal plate 30.

In addition, as shown in FIGS. 3 and 4, the substrate 21 of the plastic frame 20 further has at least one alignment portion 213. The alignment portion 213 is integrally formed on at least one corner of the plastic frame 20 and is adjacent to a side edge of the trench 212. Likewise, at least one alignment hole 32 is opened on the metal plate 30. When the metal plate 30 is adhered to the plastic frame 20, the metal plate 30 can be smoothly assembled and adhered to the plastic frame 20 with the design that the position of the alignment hole 32 matches the position of the alignment portion 213.

In this embodiment, the structure of the alignment portion 213 is used for providing a reference position when the metal plate 30 is assembled to the plastic frame 20. The alignment portion 213 may be designed as a protruding cylinder structure, and the alignment hole 32 is formed recessed from an edge of the metal plate 30, so that the alignment hole 32 of the metal plate 30 matches the alignment portion 213, thereby ensuring that the metal plate 30 will not be skewed or offset after being assembled to the plastic frame 20. Definitely, the alignment portion 213 is not limited to the design of the protruding cylinder structure, and may also be designed as various structures such as a bump or protrusion, for use in alignment of the metal plate 30 when assembled to the plastic frame 20.

Figure 6:
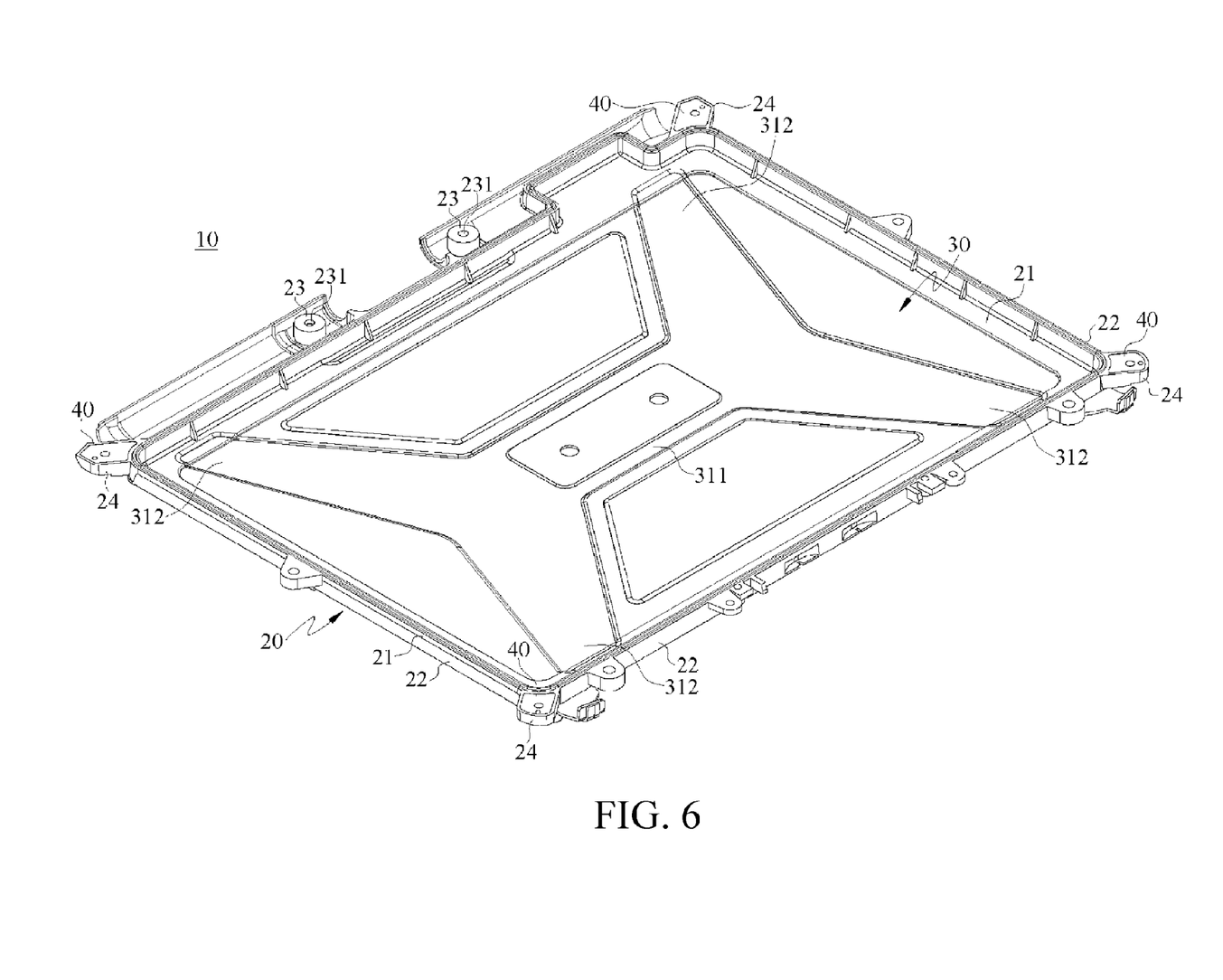
FIG. 6 is a schematic outside view of the composite casing structure according to the present invention from another viewing angle.
Figure 7:
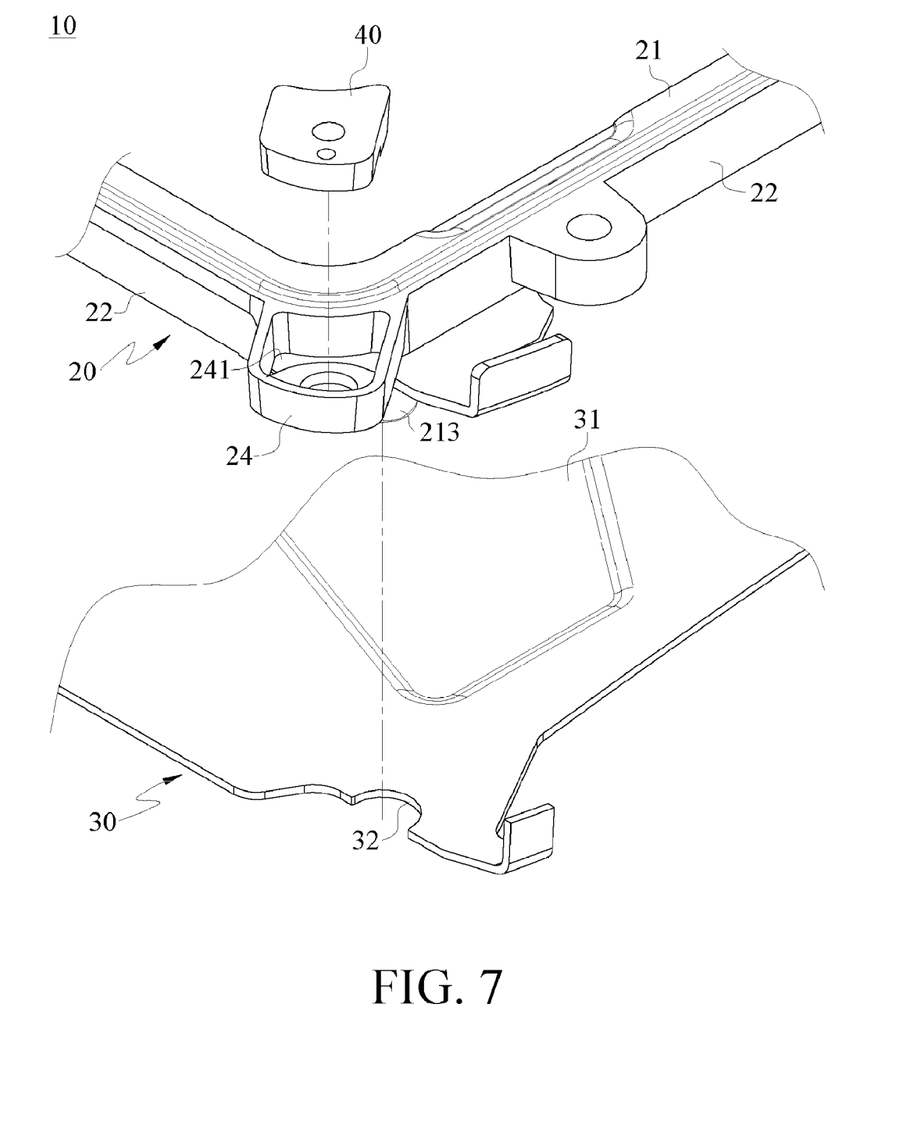
FIG. 7 is a schematic enlarged exploded view of the composite casing structure according to the present invention from another viewing angle.
Figure 8:
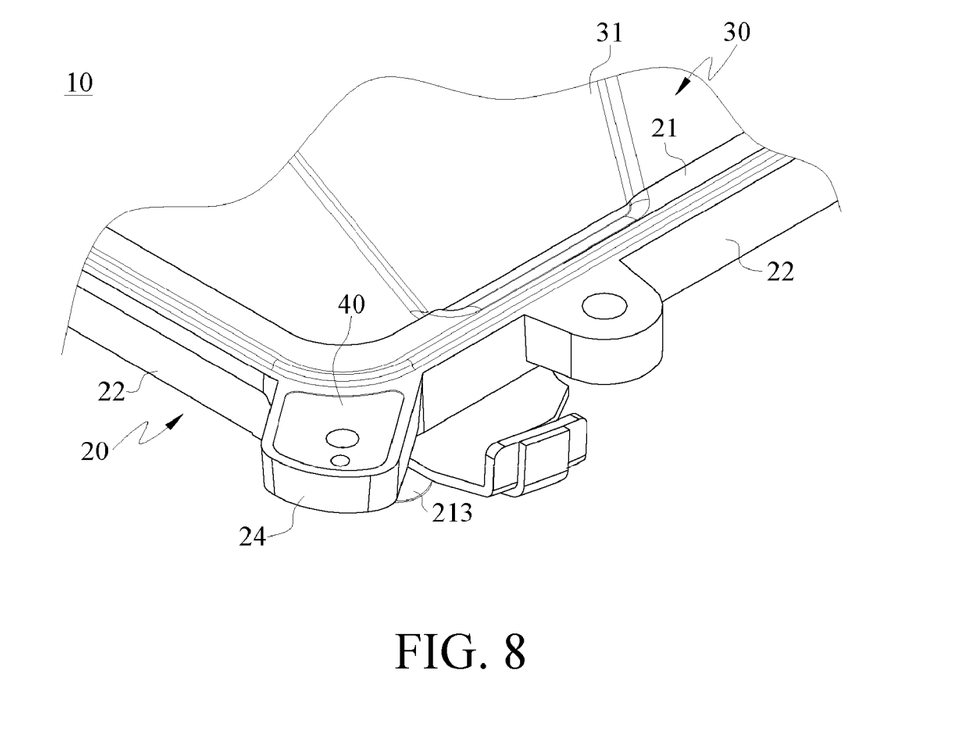
FIG. 8 is a schematic enlarged outside view of the composite casing structure according to the present invention from another viewing angle.

FIG. 6 is a schematic outside view of the composite casing structure according to the present invention from another viewing angle. FIG. 7 is a schematic enlarged exploded view of the composite casing structure according to the present invention from another viewing angle. FIG. 8 is a schematic enlarged outside view of the composite casing structure according to the present invention from another viewing angle.

The plastic frame 20 further has a plurality of side walls 22 and a plurality of studs 23 which are respectively disposed on the other side surface of the substrate 21. The side walls 22 respectively surround four side edges of the substrate 21 to form a rectangular shape, and the studs 23 are adjacent to side edges of the side walls 22, and a screw hole 231 is formed in each stud 23 respectively (as shown in FIG. 6).

Based on the technology of the composite casing 10 (i.e., combining the metal plate 30 with the plastic frame 20), the composite casing 10 can be made into an outer cover (LCD Rear Cabinet, commonly referred to as Part A in the industry) of a chassis of a notebook computer. When the composite casing 10 (i.e., Part A) and a frame of an LCD (LCD Front Cabinet, commonly referred to as Part B in the industry) are assembled to each other, a plurality of screws may be fastened in the screw holes 231 with the structural design of the studs 23, so as to assemble the composite casing 10 (i.e., Part A) and the frame (i.e., Part B, not shown) to each other.

In addition, especially notebook computers for industrial or military purposes having high requirements for water proof and dust proof, the structural design that the side walls 22 surround the plastic frame 20 can be used for water proofing and insulating purposes, so as to prevent moisture or dust from entering the plastic frame.

As shown in FIGS. 7 and 8, the plastic frame 20 further has a plurality of flanges 24. The flanges 24 are respectively arranged on four corners of the substrate 21. In this embodiment, the flanges 24 may respectively extend from the four corners of the substrate 21 and be integrally formed on the side walls 22, so that the thickness of the flanges 24 is exactly equal to that of the side walls 22. A positioning slot 241 is opened on surfaces of the flanges 24 respectively, and a plurality of matched buffer blocks 40 is placed into the corresponding positioning slots 241. The buffer block 40 is a block made of a metal material (for example, an aluminum alloy), and is used to increase the structural strength of the flange 24.

In other words, with the design that the flanges 24 having the buffer blocks 40 are respectively arranged on four corners of the plastic frame 20, if the composite casing 10 falls off by accident, the flanges 24 of the composite casing 10 may be the first to touch the ground since the flanges 24 protrude from the corners of the composite casing 10. Therefore, with the structural design of the flanges 24, impact points may be concentrated at the flanges 24, and the overall impact force is buffered by the buffer blocks 40, so as to weaken the impact force on the plastic frame 20 and the metal plate 30, thereby avoiding deformation of the plastic frame 20 or breakage of the metal plate 30.

Based on the above, the plastic frame of the present invention is formed with complex structures such as a plurality of side walls and studs by injection molding, and the metal plate is formed with the reinforcing rib for increasing the structural strength by mechanical processing such as stamping or forging, so that the composite casing has efficacies of light weight and high strength.

Therefore, the overall structural strength of the composite casing can be effectively increased by the reinforcing rib of the metal plate, and since complex assembly structures are fabricated on the plastic frame by injection molding, the overall weight and fabrication cost of the composite casing can be greatly reduced, thereby effectively improving the yield and the processing speed. In addition, the metal plate (for example, of an aluminum material) facilitates surface chemical treatment (for example, formation of hair lines by anodic treatment).

Moreover, when the composite casing falls off, impact points on the composite casing may be concentrated at the flanges with the structural design that the flanges protrude from the plastic frame, and the buffer blocks buffer the impact force, thereby avoiding deformation of the plastic frame or breakage of the metal plate.

What is claimed is:

1. A composite casing structure, applied to a housing of an electronic device, the composite casing structure comprising:
   a plastic frame, having a plurality of side walls, wherein the side walls surround four side edges of the plastic frame respectively, and at least one open portion is formed by the side walls; and
   a metal plate, having at least one reinforcing rib on a surface thereof, wherein the metal plate is combined with the plastic frame and covers the open portion, so that the reinforcing rib of the metal plate is corresponding to the open portion.

2. The composite casing structure according to claim 1, wherein the plastic frame further has a substrate, the substrate has a trench on a side surface, the trench is corresponding to the metal plate, and an adhesive is distributed in the trench, so that the adhesive is adhered to the substrate and the metal plate respectively.

3. The composite casing structure according to claim 2, wherein the substrate has at least one alignment portion, the alignment portion is adjacent to a side edge of the trench, at least one alignment hole is opened on the metal plate, and a position of the alignment portion matches a position of the alignment hole.

4. The composite casing structure according to claim 3, wherein the alignment portion is a protruding cylinder structure.

5. The composite casing structure according to claim 1, wherein the plastic frame further has a plurality of studs, the studs are respectively adjacent to side edges of the side walls, and each of the studs has a screw hole respectively.

6. The composite casing structure according to claim 1, wherein the plastic frame further has a plurality of flanges, the flanges are respectively arranged on four corners of the plastic frame, each of the flanges has a positioning slot, and a plurality of buffer blocks is placed into the positioning slots.

7. The composite casing structure according to claim 1, wherein the reinforcing rib extends and protrudes from the surface of the metal plate, and the reinforcing rib further comprises:
   a first protruding rib, arranged on the surface of the metal plate; and
   a plurality of second protruding ribs, respectively connected to two opposite ends of the first protruding rib, and respectively extending outwards from intersections with the first protruding rib to four corners of the metal plate.

\* \* \* \* \*